United States Patent
Fuse et al.

(10) Patent No.: US 7,126,648 B2
(45) Date of Patent: Oct. 24, 2006

(54) LIQUID CRYSTAL PROJECTOR COMPRISING A PLURALITY OF LIGHT SHIELDING MEMBERS FIXED BETWEEN THE LENS ARRAY AND THE POLARIZED LIGHT GENERATOR

(75) Inventors: Makoto Fuse, Matsumoto (JP); Tomiyoshi Ushiyama, Minowa-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/496,140

(22) PCT Filed: Jul. 1, 2003

(86) PCT No.: PCT/JP03/08382

§ 371 (c)(1),
(2), (4) Date: May 20, 2004

(87) PCT Pub. No.: WO2004/006000

PCT Pub. Date: Jan. 15, 2004

(65) Prior Publication Data

US 2004/0263697 A1 Dec. 30, 2004

(30) Foreign Application Priority Data

Jul. 3, 2002 (JP) ............................ 2002-195080

(51) Int. Cl.
*G02F 1/1335* (2006.01)
*G02F 1/1333* (2006.01)
*G02B 26/02* (2006.01)

(52) U.S. Cl. ................. 349/5; 349/9; 349/10; 359/232
(58) Field of Classification Search ............... 349/5, 349/9; 359/232
See application file for complete search history.

(56) References Cited

U.S. PATENT DOCUMENTS

2001/0015775 A1* 8/2001 Yamamoto et al. ............ 349/5

FOREIGN PATENT DOCUMENTS

| JP | A 10-274751 | 10/1998 |
| JP | A 2002-72361 | 3/2002 |

\* cited by examiner

*Primary Examiner*—Andrew Schechter
*Assistant Examiner*—W. Patty Chen
(74) *Attorney, Agent, or Firm*—Oliff & Berridge, PLC (57) ABSTRACT

Heat generation is inhibited in a polarized light generating optics system in a projector.

A liquid crystal projector includes: lens arrays 140, 150 that generate partial light beams from a light beam emitted from a light source; and a polarized light generating optics system 160 that generates polarized light, which is to be supplied to liquid crystal light valves, from the partial light beams. The polarized light generating optics system 160 separates s-polarized light and p-polarized light by polarization separating films 64a. The s-polarized light is reflected from reflecting films 64b and is emitted directly. The p-polarized light is converted into s-polarized light by a selective phase difference plate 66 and is emitted therefrom. The polarized light generating optics system 160 is equipped with light shielding surfaces 62b that shield light from entering into the reflecting films 64b. The lens arrays 140, 150 are also equipped with light shielding members 143, 153 that act similarly as the light shielding surfaces. Disposing the light shielding members 143, 153 can inhibit heat generation on the light shielding surfaces 62b.

12 Claims, 5 Drawing Sheets

LIQUID CRYSTAL PROJECTOR COMPRISING A PLURALITY OF LIGHT SHIELDING MEMBERS FIXED BETWEEN THE LENS ARRAY AND THE POLARIZED LIGHT GENERATOR

TECHNICAL FIELD

The present invention relates to a liquid crystal projector that projects and displays an image by using liquid crystal panels, and more particularly to a liquid crystal projector that includes a shielding plate in its polarized light generator.

BACKGROUND ART

A liquid crystal projector modulates light by liquid crystal light valves and projects an image onto a screen. In order to effectively use irradiating light from a light source, a polarized light generator is typically included to unify the irradiating light into s-polarized light or p-polarized light and to enter the polarized light into the liquid crystal light valves, as disclosed in JP1996-304739A, for example. For example, a polarized light generator that generates s-polarized light includes: a plurality of polarization separating layers that separate irradiating light into s-polarized light and p-polarized light; a plurality of reflecting layers that reflect the separated s-polarized light or p-polarized light; and a phase plate layer that converts the separated p-polarized light into s-polarized light. In typical, the polarization separating layers and the reflecting layers are arranged alternately and parallel to one another, and the phase plate layer is disposed corresponding to the polarization separating layers or the reflecting layers. Furthermore, since no desired polarized light can be obtained if the light enters directly into the reflecting layers, the polarized light generator generally includes a light shielding plate that shields the light entering the reflecting layers, as disclosed in WO 97/50012, for example. The light shielding plate is disposed at a light incident side of the polarized light generator, and is a plate-like member that has light shielding portions corresponding to the reflecting layers and opening portions corresponding to the polarization separating layers.

The polarized light generator of such a structure is used in combination with a so-called integrator optical system that divides a light beam from the light source into a plurality of partial light beams and superposes them on the liquid crystal light valves. In this case, the light from the light source is divided into a plurality of partial light beams and the obtained partial light beams converge toward the polarization separating layers. In other words, the light enters the polarization separating portions in a state of being converged onto the opening portions of the light shielding plate. Accordingly, only approximately 5% of the light is shielded by the light shielding plate.

The light shielding member generates heat when it shields the light. The heat may possibly subject the polarized light generator and thus the phase plate layer disposed thereon to high temperatures. Since the phase plate layer is generally composed of organic matters, subjecting it to high temperatures may possibly cause a decrease in a useful life of the layer.

SUMMARY OF THE INVENTION

The present invention solves the problems related to the prior art and mitigates adverse effects due to heat generation in the polarized light generator.

In order to solve the above problems, a first structure of the present invention discloses a projector that modulates polarized light by liquid crystal light valves and projects an image. The projector includes:
  a light source that emits a light beam;
  a lens array that divides the light beam into a plurality of partial light beams;
  a polarized light generator to which the partial light beams is incident and that generates polarized light to be emitted to the liquid crystal light valves;
  the polarized light generator includes:
  a plurality of polarization separating layers that separate each of the incident partial light beams into s-polarized light and p-polarized light;
  a plurality of reflecting layers that reflect the s-polarized light or the p-polarized light that was separated by the polarization separating layers, the polarization separating layers and the reflecting layers are arranged alternately; and
  a phase plate layer that unifies the separated s-polarized light and p-polarized light into one direction of polarization;
  a first light shielding member disposed between a light incident side of the polarized light generator and the lens array, the first light shielding member having a plurality of light shielding portions that are disposed corresponding to the reflecting layers, and the plurality of light shielding portions inhibiting the partial light beams from entering layers other than the polarization separating layers; and
  a second light shielding member disposed between the first light shielding member and the lens array, the second light shielding member having a plurality of light shielding portions that are disposed corresponding to the reflecting layers, and the plurality of light shielding portions inhibiting the partial light beams from entering the reflecting layers.

The projector of the present invention has not only the first light shielding member disposed at the incident side of the polarized light generator, but also the second light shielding member. In this way, it is possible to inhibit heat generation in the first light shielding member disposed at the light incident side of the polarized light generator and to mitigate adverse effects due to the heat generation, such as a decrease in a useful life of the phase plate layer.

In general, the closer the light shielding member is located with respect to the polarized light generator, more precisely it can shield the partial light beams from entering layers other than the polarization separating layers. In the present invention, disposing the light shielding members at two places or more, including at the light incident side of the polarized light generator, ensures shielding of light with higher precision while mitigating adverse effects due to heat.

In the present invention, widths of the light shielding portions of the second light shielding member are preferably set smaller than widths of the light shielding portions of the first light shielding member. In this way, it is possible to inhibit unnecessary shielding of light. It should be noted that in the case where more than two light shielding members are included, widths of light shielding portions of at least two of them may satisfy such a relationship.

The projector of the present invention may also include:
  a second lens array that is disposed at the light incident side of the polarized light generator; with
  the first light shielding member being disposed at a light exit side of
  the second lens array; and
  the second light shielding member being disposed at a light incident side of the second lens array.

In the integrator optical system, the partial light beams become more condensed as they get closer to the polarized light generator. Accordingly, in the structure that has the second lens array at the light incident side of the polarized light generator, disposing the light shielding members in a way to sandwich the second lens array can advantageously lower the possibility of shielding the light that must be usable and ensure easier shielding of the unusable light, thereby improving usability and light shielding efficiency of the light.

A second structure of the present invention discloses a projector that modulates light by liquid crystal light valves and projects an image, including:

a light source that emits a light beam;

a lens array that divides the light beam into a plurality of partial light beams;

a polarized light generator to which the partial light beams is incident and that generates polarized light to be emitted to the liquid crystal light valves;

the polarized light generator includes:

a plurality of polarization separating layers that separate each of the incident partial light beams into s-polarized light and p-polarized light;

a plurality of reflecting layers that reflect the s-polarized light or the p-polarized light that was separated by the polarization separating layers, the polarization separating layers and the reflecting layers are arranged alternately; and a phase plate layer that unifies the separated s-polarized light and p-polarized light into one direction of polarization;

a plurality of light shielding members disposed between a light incident side of the polarized light generator and the lens array, the plurality of light shielding members having a plurality of light shielding portions that are disposed corresponding to the reflecting layers, and the plurality of light shielding portions inhibiting the partial light beams from entering the reflecting layers.

Any number of light shielding members can be disposed at any location between the first lens array and the polarized light generator. With such a structure, it is possible to achieve the same effect as the first structure.

In the second structure, widths of the respective light shielding portions in the plurality of light shielding members may be set smaller with increasing a distance from the polarized light generator.

In addition, a second lens array may disposed at the light incident side of the polarized light generator, with at least one of the plurality of light shielding members being disposed at a light exit side of the second lens array; and at least one of the rest of the plurality of light shielding members being disposed at a light incident side of the second lens array.

DETAILED DESCRIPTION OF THE INVENTION

Figure 1:
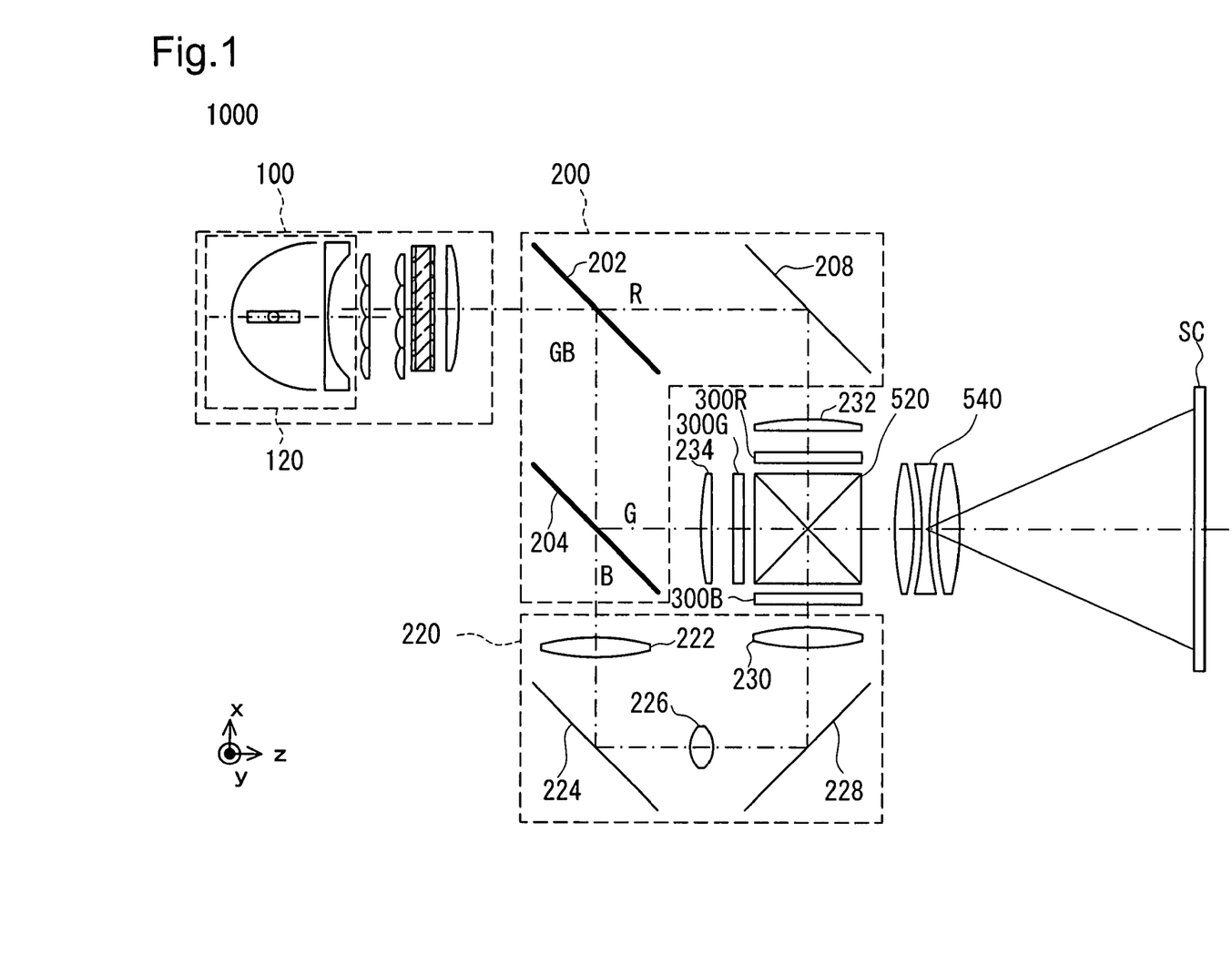
FIG. 1 is a schematic that shows the outline structure of a projector as an embodiment.

A. General Structure:

FIG. 1 is a schematic that shows the outline structure of a projector as an embodiment. A projector 1000 includes: an illumination optics system 100; a colored light separation optics system 200; a relay optics system 220; three liquid crystal light valves 300R, 300G, and 300B; a cross dichroic prism 520; and a projector lens 540.

The illumination optics system 100 emits light from a light source 120. The colored light separation optics system 200 uses dichroic mirrors 202, 204 to separate the light into three colors i.e. red (R), green (G), and blue (B). The dichroic mirror 202 allows the red colored light R to pass through while reflecting the blue colored light B and the green colored light G, thereby separating the red colored light R. The dichroic mirror 202 allows the blue colored light B to pass through while reflecting the green colored light G, thereby separating the blue colored light B and the green colored light G.

The red colored light R reflects from a reflecting mirror 208, passes through a field lens 232, and enters a liquid crystal light valve 300R. The field lens 232 converts the incident light into a light beam that is substantially parallel to its central axis. The green colored light G reflects from the dichroic mirror 204, passes through a field lens 234, and enters a liquid crystal light valve 300G. The blue colored light goes through the relay optics system 220 and enters a liquid crystal light valve 300B. The relay optics system 200 is comprised of three lenses: a light incident side lens 222, a relay lens 226, and a field lens 230; and two reflecting mirrors 224, 228.

Each colored light is modulated in the respective liquid crystal light valves 300R, 300G, 300B according to image information. The respective modulated colored lights are combined in the cross dichroic prism 520 and are projected onto a screen SC via the projector lens 540.

Figure 2:
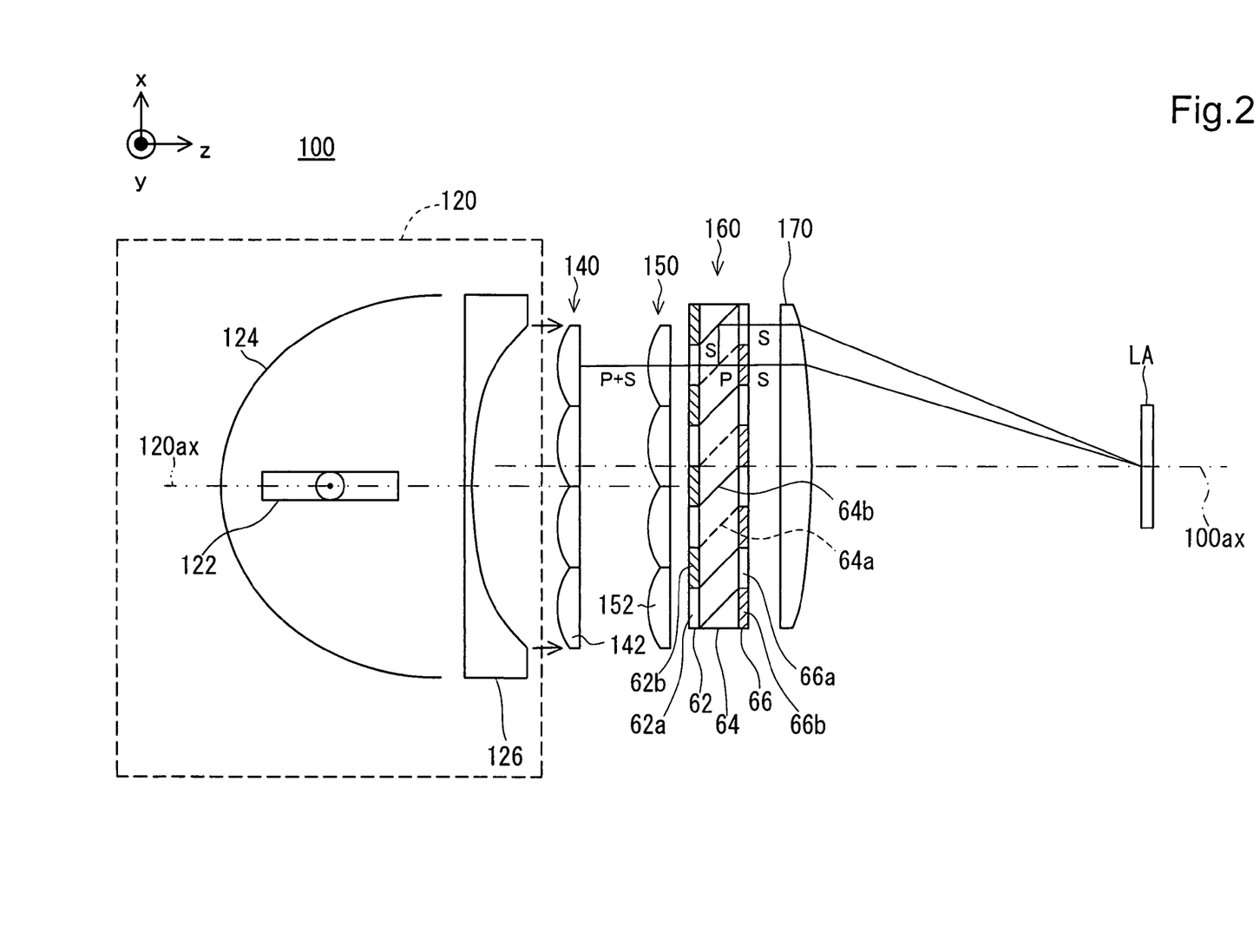
FIG. 2 is an enlarged view of an illumination optics system 100.

B. Illumination Optics System:

FIG. 2 is an enlarged view of the illumination optics system 100. In the present embodiment, an integrator optical system, i.e. an optical system that divides a light beam from a light source into a plurality of partial light beams and superposes them in liquid crystal light valves, is used.

In the illumination optics system 100, a light source apparatus 120 emits an approximately parallel light beam. The light emitted from a light source lamp 122 is reflected by a reflector 124. Although the reflector 124 has a concave surface of ellipsoid of revolution in the present embodiment, the reflector 124 may also have a concave surface of paraboloid of revolution. The reflected light is converted by a parallelizing lens 126 into light that is approximately parallel to a light source optical axis 120ax.

A first lens array 140 has a plurality of planoconvex lenses 142 that are arranged in a matrix in an X-direction and a Y-direction. Each convex lens 142 appears to have a rectangular outline when being looked from a Z-direction, which is geometrically similar to an image formation area in a liquid crystal light valve LA. The first lens array 140 divides the light beam emitted from the light source apparatus 120 into a plurality of partial light beams. It should be noted that although the planoconvex lenses 142 are used in the present embodiment, biconvex lenses may also be used alternatively. In addition, although curved surfaces of the planoconvex lenses 142 face the light source 120 in the present embodiment, the curved surfaces may also face a polarized light generating optics system 160.

Similar to the first lens array 140, a second lens array 150 also has a plurality of planoconvex lenses 152 that are arranged in a matrix in the X-direction and the Y-direction. The second lens array 150 functions to unify central axes of the respective partial light beams into a direction that is approximately parallel to a system optical axis 100ax. It should be noted that although a lens array of the same size and the same shape as the first lens array 140 is used for the second lens array 150 in the present embodiment, various lens arrays of different sizes and different shapes may also be used alternatively. Unlike the first lens array 140, however, the outline of each convex lens 152 when being looked from the Z-direction is not necessarily geometrically similar to the image formation area in the liquid crystal light valve LA. It should be noted that although the planoconvex lenses 152 are used in the present embodiment, biconvex lenses may also be used alternatively. In addition, curved surfaces of the planoconvex lenses 152 may also face the polarized light generating optics system 160, rather than the light source 120.

The polarized light generating optics system 160 includes a light shielding member 62, a polarizing beam splitter array 64, and a selective phase difference plate 66.

The polarizing beam splitter array 64 is formed by bonding together a plurality of columnar light transmissive plate materials, each of which having an approximately parallelogram cross section. A polarization separating film 64a or a reflecting film 64b is alternately provided at each of the interfaces of the light transmissive plate materials. The polarization separating films 64a allow p-polarized light to pass through while reflecting off s-polarized light, thereby separating incident partial light beams into s-polarized light and p-polarized light. The polarization separating films 64a can be formed of dielectric multilayer films, for example. The reflecting films 64b are the films that reflect off every light beam and can be formed of dielectric multilayer films or metal films. It should be noted that, for the reflecting films 64b, the films that only reflect s-polarized light may also be used in place of the films that reflect every light beam (both the s-polarized light and the p-polarized light). Such films can be formed of dielectric multilayer films.

The light shielding member 62 has light shielding surfaces 62b and opening surfaces 62a arranged in stripes. The light shielding surfaces 62b are positioned so as to prevent entries of light into the respective reflecting films 64b and the opening surfaces 62a are positioned so as to allow entries of light into the respective polarization separating films 64a. For the light shielding member 62, a tabular transparent body (for example, a glass plate) that is partially formed with light shielding films (for example, chrome films, aluminum films, dielectric multilayer films, or the like) can be used. Alternatively, a light shielding plate such as an aluminum plate that is formed with opening portions may be used. Alternatively, the light shielding member 62a may be formed with light shielding surfaces that are made of light shielding evaporated films (for example, chrome films, aluminum films, or dielectric multilayer films) only at portions that correspond to the reflecting films 64b among an entire light incident side of the polarizing beam splitter array 64. It should be noted that other light shielding members other than the light shielding member 62 are also included in the present embodiment, although not illustrated in FIG. 2. The arrangement of these light shielding members is discussed in detail later.

The selective phase difference plate 66 has opening layers 66a and λ/2 phase plate layers 66a arranged in stripes. The opening layers 66a allow polarized light to pass through directly. The λ/2 phase plate layers 66b are polarization conversion elements comprised of organic matters, and convert the direction of polarization of the incident light into a direction perpendicular thereto and emit the converted light. This function converts p-polarized light into s-polarized light, for example. The λ/2 phase plate layers 66b are arranged so as to allow the entry of light that has passed through the polarization separating films 64a. It should be noted that the selective phase difference plate 66 may only have the λ/2 phase plate layers 66a and not the opening layers 66a. Alternatively, the λ/2 phase plate layers 66b and the opening layers 66a may be switched their locations, so that the λ/2 phase plate layers 66b may be in places corresponding to the reflecting layers 64b, and vice versa. In short, the selective phase difference plate 66 is not restricted to the configuration used in the present embodiment, but may be in any configuration as long as it can unify the light from the polarizing beam splitter array 64 into one direction of polarization.

The partial light beams emitted from the lens arrays 140 and 150 pass through the opening surfaces 62a of the light shielding member 62 and enters the polarization separating films 64a. Among the incident light, p-polarized light passes through the polarization separating films 64a, enters the λ/2 phase plate layers 66b, and is converted into s-polarized light. Among the incident light, s-polarized light is reflected from the polarization separating films 64a and is emitted from the opening layers 66a without change. In this way, the light emitted from the polarized light generating optics system 160 can be approximately unified into s-polarized light. The polarized light generating optics system 160 may also have the λ/2 phase plate layers 66b and the opening layers 66a switched their locations so that the system may be configured to unify the light into p-polarized light.

The partial light beams emitted from the polarized light generating optics system 160 are superposed on an illumination area LA by a superposing lens 170. At this time, an intensity of the light irradiating the illumination area LA may have an approximately uniform distribution.

Figure 3:
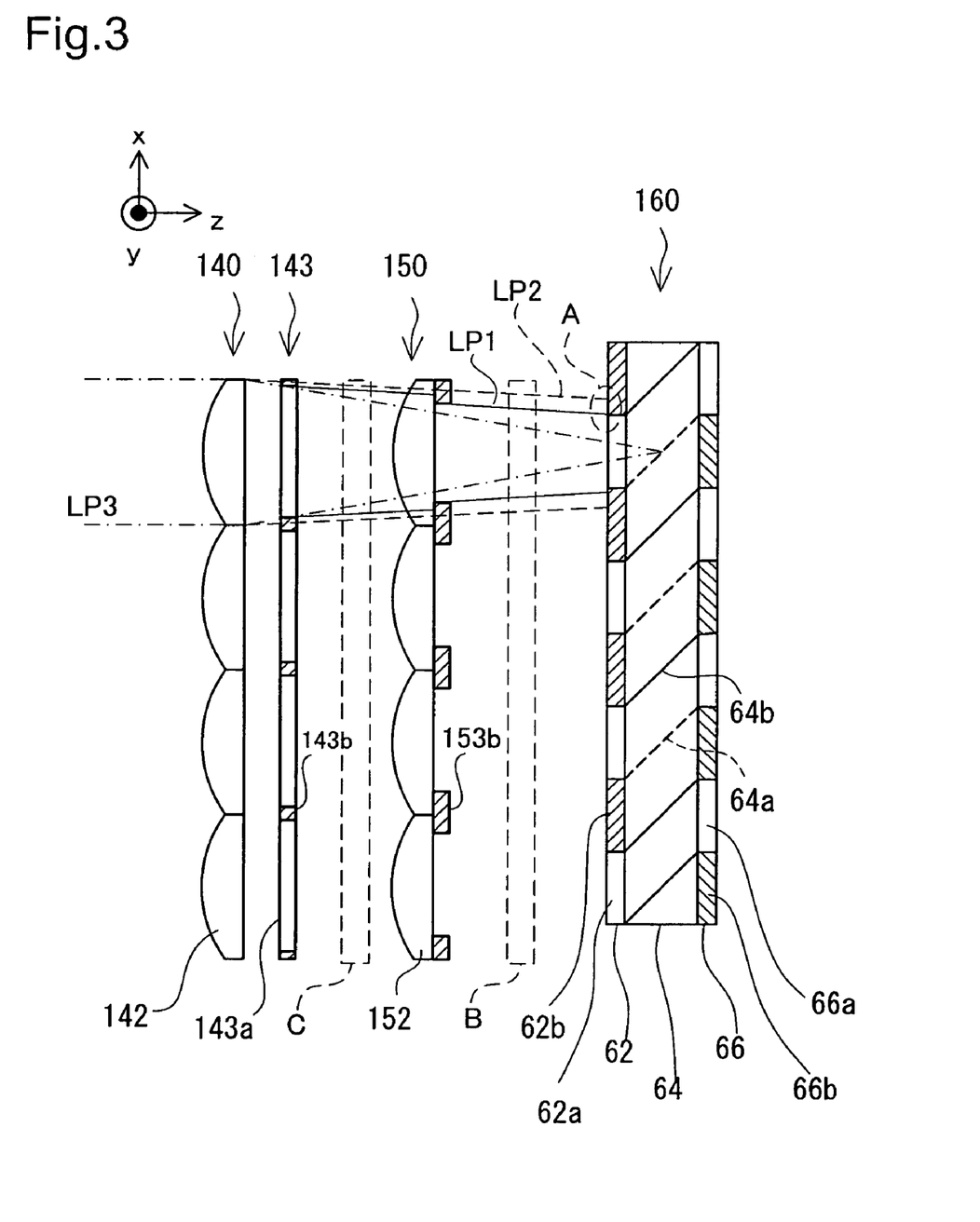
FIG. 3 is a schematic that shows the arrangement of light shielding members.

C. Arrangement of Light Shielding Members:

FIG. 3 is a schematic that shows the arrangement of the light shielding members, illustrating an enlarged view of the lens arrays 140 and 150 and the polarized light generating optics system 160. Although not illustrated in FIG. 2, the present embodiment further includes light shielding members 143 and 153 that are disposed between the light shielding member 62 and the first lens array 140.

Figure 4:
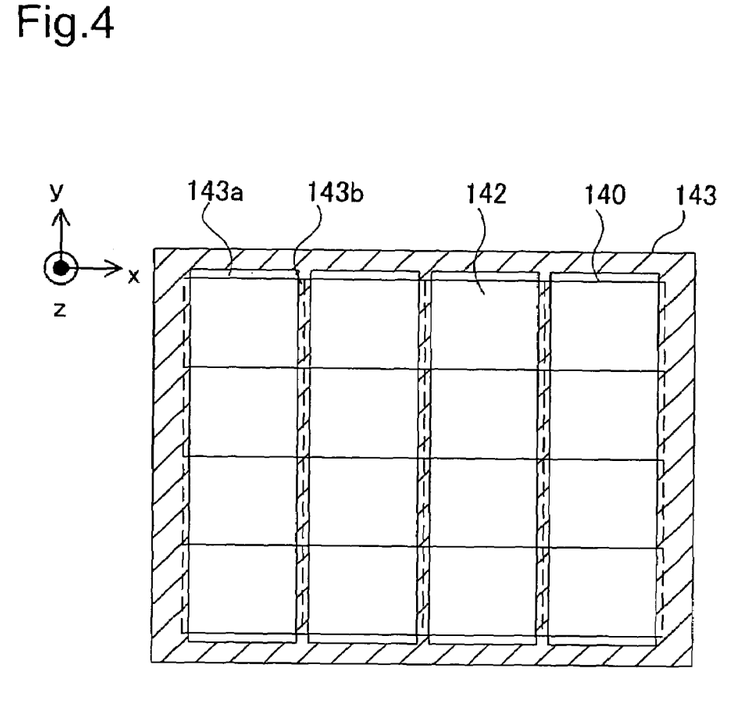
FIG. 4 is a schematic that illustrates a light shielding member 143.

The light shielding member 143 is disposed at a light exit side of the first lens array 140. The light shielding member 143 has a structure with opening surfaces 143a and light shielding surfaces 143b arranged in stripes, as shown in FIG. 4. The light shielding surfaces 143b are disposed at boundaries of the lenses 152 in the Y-direction. For the light shielding member 143, a tabular transparent body (for example, a glass plate) that is partially formed with light shielding films (for example, chrome films, aluminum films, dielectric multilayer films, or the like) can be used. Alternatively, a light shielding plate such as an aluminum plate that is formed with opening portions may be used. Since the lens array 140 of the present embodiment uses planoconvex lenses 152 that have their curved surfaces facing the light source 120, it is also possible to form light shielding surfaces that are made of light shielding evaporated films (for example, chrome films, aluminum films, or dielectric multilayer films) on the light exit side surface of the first lens array 140 to use them as the light shielding member 143.

Figure 5:
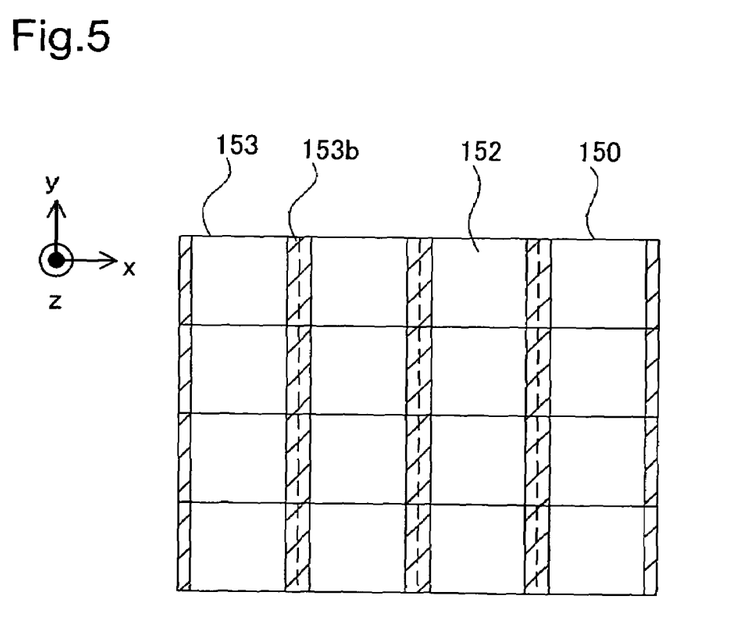
FIG. 5 is a schematic that illustrates a light shielding member 153.

The light shielding member 153 is disposed at the light exit side of the second lens array 150. As shown in FIG. 5, the light shielding member 153 has a structure with light shielding surfaces 153b, which are made of light shielding evaporated films (for example, chrome films, aluminum films, or dielectric multilayer films) that are formed in stripes along the boundaries in the Y-direction, on flat surfaces of the lenses 152 constituting the lens array 150. The light shielding member 153 is not restricted to such a structure, but may also be a tabular transparent body (for example, a glass plate) that is partially formed with light shielding films (for example, chrome films, aluminum films, dielectric multilayer films, or the like) as well as a light shielding plate such as an aluminum plate that is formed with opening portions.

Suppose the system is in a completely ideal state, a light beam emitted from the light source 20 parallelly enters the lens array 140 and is divided into a plurality of partial light beams, converges as it gets closer to the polarized light generating optics system 160, and finally becomes spot-like on a polarization separating film 64a, as shown by chain lines LP3 in FIG. 3. In practice, however, the light may sometimes be unable to converge within an opening surface 62a of the light shielding member 52, as shown by dashed lines LP2 in FIG. 3, due to various factors such as the light source lamp 122 not being a point source (the light source 122 has a light of a finite size), design errors of the optical elements, axial deviations between the optical elements, and so on. In case where the light shielding members 143 and 153 are not included, the light is shielded only by the light shielding member 62 in a region A, which results in a generation of large heat value on the light shielding member 62. In the present embodiment, however, providing the light shielding members 143 and 153 can distribute heat-generating portions, as shown by solid lines LP1 in FIG. 3, so that heat generation on the light shielding member 62 can be inhibited. It is therefore possible to inhibit heat generation on the selective phase difference plate 66 that is comprised of organic matters, thereby restraining a decrease in its useful life.

Considering that the partial light beams converge as they get closer to the polarized light generating optics system 160, ideally, as shown by the chain lines LP3, it is preferable that the farther from the light shielding member 62 a light shielding member is, the narrower the widths (the sizes in the X-direction) of its light shielding surfaces are set. That is to say, widths of the light shielding surfaces 143bs of the light shielding member 143 are preferably set narrower than widths of the light shielding surfaces 153b of the light shielding member 153. Similarly, considering the presence of the light shielding member 62, it is preferable that the farther from the polarized light generator 160 a light shielding member is, the narrower the widths (the sizes in the X-direction) of its light shielding surfaces are set. That is to say, it is preferable that the widths of the light shielding surfaces are set to have the following relationship: (the widths of the light shielding surfaces 62b)>(the widths of the light shielding surfaces 153b)>(the widths of the light shielding surfaces 143b). This is because setting the widths of the light shielding surfaces 62b, 153b and 143b in such a relationship can reduce the possibility of undesirably shielding the light that is usable in the liquid crystal light valves 300R, 300G, 300B.

For example, in case where a cooling mechanism is provided for cooling the polarizing beam splitter array 64 so as to prevent an elevation of temperature in the selective phase difference plate 66, it is possible to downsize the cooling mechanism and reduce noises therein in the present embodiment, since heat generation can be inhibited in the light shielding member 62.

From the viewpoint of light shielding performance that shields entries of light into the reflecting films 64b, it is preferable to dispose the light shielding member 62 on the polarizing beam splitter array 64 itself. In the present embodiment, using the light shielding members 143 and 153 in combination with the light shielding member 62 ensures the light shielding performance while inhibiting heat generation on the light shielding member 62.

D. Modifications:

The number and the locations of the light shielding members may be set as appropriate by taking into account tolerance for heat generation, level of convergence for partial light beams, and such. The widths of the light shielding surfaces of the light shielding members may be set as appropriate by taking into account the tolerance for heat generation, the level of convergence for partial light beams, and additionally the locations where the light shielding members are disposed.

In other words, the number of the light shielding members is not restricted to three, although three light shielding members 62, 143 and 153 are used in the above-described embodiment. For example, any one of the light shielding members 143 and 153 may be omitted. The light shielding member 62 may be omitted too, although it is disposed in the polarized light generating optics system 160 in the present embodiment. This enables further inhibition of heat generation in the polarized light generating optics system, although the light shielding performance may possibly be degraded. In addition to the light shielding members 62, 143 and 153, it is also possible to dispose one or more light shielding members in locations such as between the lens array 150 and the polarized light generating optics system 160 (for example, in a region B of FIG. 3) or between the lens array 140 and the lens array 150 (for example, in a region C of FIG. 3).

Furthermore, the locations where the light shielding members are disposed are also not restricted to those described in the above embodiment. For example, although the light shielding member 143 is disposed at the light exit side of the first lens array 140 in the above embodiment, the light shielding member 143 may also be disposed slightly closer to the second lens array between the lens array 140 and the lens array 150 (for example, in the region C of FIG. 3). Similarly, although the light shielding member 153 is disposed at the light exit side of the second lens array 150 in the above embodiment, the light shielding member 153 may also be disposed slightly closer to the polarized light generating optics system 160 between the lens array 150 and the polarized light generating optics system 160 (for example, in the region B of FIG. 3).

That is to say, all that is required is that at least two light shielding members are disposed between the first lens array 140 and the light incident side of the polarizing beam splitter array 164, which functions as the polarized light generator.

Figure 6:
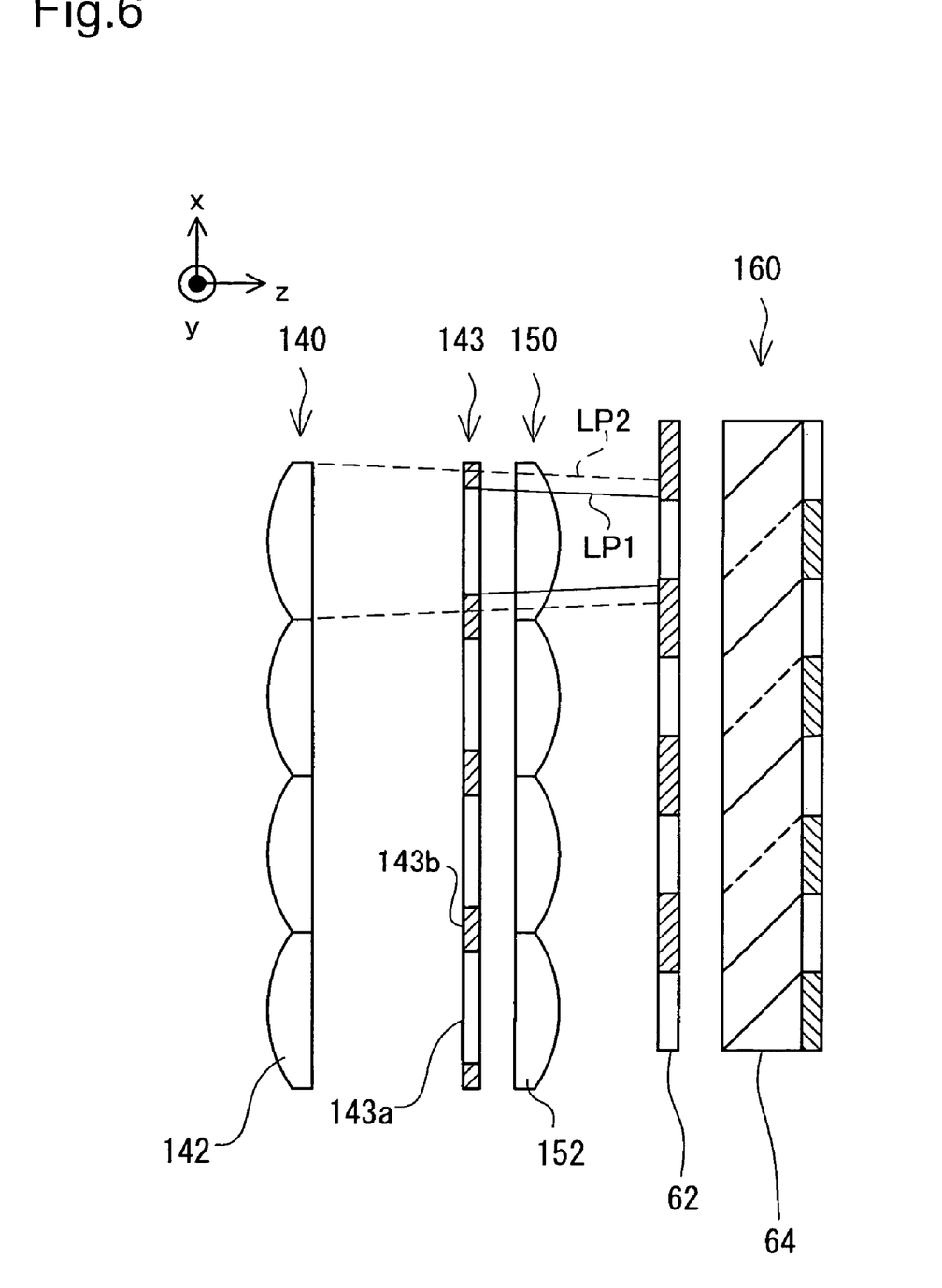
FIG. 6 is a schematic that shows the arrangement of light shielding members as a modification.

In consideration of practicality, it is preferable that the two light shielding members are disposed to sandwich the second lens array 150. That is to say, as shown in FIG. 6, it is preferable that one light shielding member 62 or 153 is disposed at the light exit side of the second lens array 150, while the other light shielding member 143 is disposed at the light incident side of the second lens array 150. As described previously, the partial light beams converge as they get closer to the polarizing beam splitter array 64. Such an arrangement of the light shielding members can thus lower the possibility of shielding the light that must be usable and ensure easier shielding of the unusable light. It is thus possible to improve usability and light shielding efficiency of the light, while achieving an effect of distributing heat generating portions.

Although various embodiments of the present invention are described above, it is clearly understood that the present invention is not restricted to these embodiments, but there may be various configurations without departing from the spirit of the present invention. For example, the present invention is also applicable to projectors that use reflective type of liquid crystal apparatuses. There are two types of liquid crystal projectors: a front-type that projects an image from a side of viewing its projecting surface; and a rear type that projects an image from a direction opposite to a side of viewing its projecting surface, to both of which the present invention is applicable. The number of the liquid crystal light valves is not restricted to three, but there may be one, two, four, or more than four of them to be included. In addition, the present invention is applicable not only to color projectors but also to monochrome projectors.

INDUSTRIAL APPLICABILITY

The present invention can be used to inhibit heat generation in a polarized light generator, in a liquid crystal projector that projects and displays an image by using liquid crystal panels.

What is claimed is:

1. A projector that modulates polarized light by at least one liquid crystal light valve and projects an image, comprising:
a light source that emits a light beam;
a lens array that divides the light beam into a plurality of partial light beams;
a polarized light generator to which the partial light beams are incident and that generates polarized light to be emitted to the at least one liquid crystal light valve;
the polarized light generator includes:
a plurality of polarization separating layers that separate each of the incident partial light beams into s-polarized light and p-polarized light, respectively;
a plurality of reflecting layers that reflect the s-polarized light or the p-polarized light that was separated by the polarization separating layers, the polarization separating layers and the reflecting layers are arranged alternately; and
a phase plate layer that unifies the separated s-polarized light and p-polarized light into one direction of polarization;
a first stationary light shielding member unmovably fixed between a light incident side of the polarized light generator and the lens array, the first light shielding member having a plurality of light shielding portions that are disposed corresponding to the reflecting layers, and the plurality of light shielding portions inhibiting the partial light beams from entering layers other than the polarization separating layers; and
a second stationary light shielding member unmovably fixed between the first light shielding member and the lens array, the second light shielding member having a plurality of light shielding portions that are disposed corresponding to the reflecting layers, and the plurality of light shielding portions inhibiting the partial light beams from entering the reflecting layers.

2. The projector according to claim 1, widths of the light shielding portions of the second light shielding member being set smaller than widths of the light shielding portions of the first light shielding member.

3. The projector according to claim 1, further comprising:
a second lens array that is disposed at the light incident side of the polarized light generator;
the first light shielding member being disposed at a light exit side of the second lens array; and
the second light shielding member being disposed at a light incident side of the second lens array.

4. A projector that modulates polarized light by at least one liquid crystal light valve and projects an image, comprising:
a light source that emits a light beam;
a lens array that divides the light beam into a plurality of partial light beams;
a polarized light generator to which the partial light beams are incident and that generates polarized light to be emitted to the at least one liquid crystal light valve;
the polarized light generator includes:
a plurality of polarization separating layers that separate each of the incident partial light beams into s-polarized light and p-polarized light;
a plurality of reflecting layers that reflect the s-polarized light or the p-polarized light that was separated by the polarization separating layers, the polarization separating layers and the reflecting layers are arranged alternately; and
a phase plate layer that unifies the separated s-polarized light and p-polarized light into one direction of polarization; and
a plurality of stationary light shielding members unmovably fixed between a light incident side of the polarized light generator and the lens array, the plurality of light shielding members having a plurality of light shielding portions that are disposed corresponding to the reflecting layers, and the plurality of light shielding portions inhibiting the partial light beams from entering the reflecting layers.

5. The projector according to claim 4, a width of each light shielding portion in the plurality of light shielding members being set smaller with increasing a distance from the polarized light generator.

6. The projector according to claim 4, further comprising:
a second lens array that is disposed at the light incident side of the polarized light generator;
at least one of the plurality of light shielding members being disposed at a light exit side of the second lens array; and
at least one of the rest of the plurality of light shielding members being disposed at a light incident side of the second lens array.

7. A projector comprising:
a light source that emits a light beam;
a lens array that divides the light beam into a plurality of partial light beams;
a polarized light generator to which the partial light beams are incident and that generates polarized light the polarized light generator includes;
- a plurality of polarization separating layers that separate each of the incident partial light beams into s-polarized light and p-polarized light, respectively;
- a plurality of reflecting layers that reflect the s-polarized light or the p-polarized light that was separated by the polarization separating layers, the polarization separating layers and the reflecting layers are arranged alternately; and
- a phase plate layer that unifies the separated s-polarized light and p-polarized light into one direction of polarization;
- a first stationary light shielding member unmovably fixed between a light incident side of the polarized light generator and the lens array, and the first light shielding member having a plurality of light shielding portions that are disposed corresponding to the reflecting layers;
- a second stationary light shielding member unmovably fixed between the first light shielding member and the lens array, and the second light shielding member having a plurality of light shielding portions that are disposed corresponding to the reflecting layers;
- a light modulating device that modulates the polarized light generated by the polarized light generator; and
- a projector lens that projects light modulated by the light modulating device.

8. The projector according to claim 7, widths of the light shielding portions of the second light shielding member being set smaller than widths of the light shielding portions of the first light shielding member.

9. The projector according to claim 7, further comprising:
- a second lens array that is disposed at the light incident side of the polarized light generator;
- the first light shielding member being disposed at a light exit side of the second lens array; and
- the second light shielding member being disposed at a light incident side of the second lens array.

10. A projector comprising:
- a light source that emits a light beam;
- a lens array that divides the light beam into a plurality of partial light beams;
- a polarized light generator to which the partial light beams are incident and that generates polarized light;
the polarized light generator includes:
- a plurality of polarization separating layers that separate each of the incident partial light beams into s-polarized light and p-polarized light;
- a plurality of reflecting layers that reflect the s-polarized light or the p-polarized light that was separated by the polarization separating layers, the polarization separating layers and the reflecting layers are arranged alternately; and
- a phase plate layer that unifies the separated s-polarized light and p-polarized light into one direction of polarization;
- a plurality of stationary light shielding members unmovably fixed between a light incident side of the polarized light generator and the lens array, and the plurality of light shielding members having a plurality of light shielding portions that are disposed corresponding to the reflecting layers;
- a light modulating device that modulates the polarized light generated by the polarized light generator; and
- a projector lens that projects light modulated by the light modulating device.

11. The projector according to claim 10, a width of each light shielding portion in the plurality of light shielding members being set smaller with increasing a distance from the polarized light generator.

12. The projector according to claim 10, further comprising:
- a second lens array that is disposed at the light incident side of the polarized light generator;
- at least one of the plurality of light shielding members being disposed at a light exit side of the second lens array; and
- at least one of the rest of the plurality of light shielding members being disposed at a light incident side of the second lens array.

* * * * *